(12) United States Patent
Trent et al.

(10) Patent No.: US 10,036,433 B2
(45) Date of Patent: *Jul. 31, 2018

(54) CLUTCH FOR CONTINUOUSLY VARIABLE TRANSMISSION

(71) Applicant: Ford Global Technologies, LLC, Dearborn, MI (US)

(72) Inventors: James Trent, South Lyon, MI (US); Norman Jerry Bird, Plymouth, MI (US); Matthew Thomas Trent, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 141 days.

This patent is subject to a terminal disclaimer.

(21) Appl. No.: 15/181,473

(22) Filed: Jun. 14, 2016

(65) Prior Publication Data

US 2017/0356507 A1    Dec. 14, 2017

(51) Int. Cl.
| | |
|---|---|
| *F16D 41/12* | (2006.01) |
| *F16D 27/102* | (2006.01) |
| *F16D 41/16* | (2006.01) |
| *F16H 9/12* | (2006.01) |
| *F16H 37/02* | (2006.01) |

(52) U.S. Cl.
CPC ........... *F16D 41/12* (2013.01); *F16D 27/102* (2013.01); *F16D 41/16* (2013.01); *F16H 9/12* (2013.01); *F16H 37/022* (2013.01); *F16H 37/021* (2013.01)

(58) Field of Classification Search
CPC ........ F16D 41/12; F16D 41/16; F16D 27/102; F16H 9/12; F16H 37/022; F16H 37/021

USPC ....... 475/200, 210, 211, 212, 213; 192/33 C, 192/43.1, 45.1
See application file for complete search history.

(56) References Cited

U.S. PATENT DOCUMENTS

| | | | |
|---|---|---|---|
| 6,401,853 B1 | 6/2002 | Turski et al. | |
| 6,855,084 B2 * | 2/2005 | Sato | ...................... F16H 37/022 475/209 |
| 7,278,939 B2 * | 10/2007 | Sato | ...................... F16H 37/021 474/72 |

(Continued)

FOREIGN PATENT DOCUMENTS

| | | |
|---|---|---|
| EP | 2262656 B1 | 9/2012 |
| FR | 2807489 B1 | 1/2007 |

(Continued)

*Primary Examiner* — Roger L Pang
(74) *Attorney, Agent, or Firm* — James Dottavio; Brooks Kushman P.C.

(57) ABSTRACT

A continuously variable transmission includes a first shaft driveably connected to a power-plant and having a first pair of sheave disks, and a second shaft having a second pair of sheave disks. A tension member is connected to the first and second pairs of disks such that power is transmittable between the first and second shafts. A third shaft is selectively driveably connected to the second shaft via a clutch. The clutch includes an inner race fixed to one of the second and third shafts, and an outer race fixed to a gear and having an inner surface circumscribing the inner race. At least one pawl is biased to couple the races in a fixed relationship for common rotation. The clutch further includes an electric coil and an armature configured to engage the pawl to decouple the races in response to current being supplied to the electric coil.

18 Claims, 7 Drawing Sheets

(56) References Cited

U.S. PATENT DOCUMENTS

| | | | |
|---|---|---|---|
| 8,641,571 B2 | 2/2014 | Ichikawa et al. | |
| 8,926,472 B2 | 1/2015 | Shinojima et al. | |
| 9,181,993 B1 * | 11/2015 | Swales | F16D 41/16 |
| 9,366,328 B2 * | 6/2016 | Yoshino | F16H 37/021 |
| 9,517,694 B2 | 12/2016 | Nolte et al. | |
| 9,638,267 B2 * | 5/2017 | Yamatani | F16D 27/102 |
| 9,732,809 B2 * | 8/2017 | Niemiec | F16D 41/12 |
| 9,738,286 B1 * | 8/2017 | Trent | B60W 30/20 |
| 2009/0194381 A1 * | 8/2009 | Samie | B60K 6/383 |
| | | | 192/43.2 |
| 2016/0159187 A1 | 6/2016 | Mohamed | |

FOREIGN PATENT DOCUMENTS

| | | | | |
|---|---|---|---|---|
| GB | 751616 A * | 7/1956 | | F16H 3/003 |
| GB | 1537345 A | 12/1978 | | |
| WO | WO-2015127546 A1 * | 9/2015 | | F16D 41/125 |
| WO | WO-2016170426 A4 * | 12/2016 | | F16D 41/14 |

\* cited by examiner

CLUTCH FOR CONTINUOUSLY VARIABLE TRANSMISSION

TECHNICAL FIELD

This disclosure relates to the field of vehicle clutches. More particularly, the disclosure pertains to an electromagnetically actuated clutch used within a continuously variable transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Some transmissions, called discrete-ratio transmissions, are configured to establish a finite number of speed ratios between an input shaft and an output shaft. When the currently selected ratio is no longer appropriate, a discrete ratio transmission must shift to a different one of the available speed ratios. Other transmissions, called continuously variable transmissions, are capable of establishing any speed ratio between lower and upper limits. Continuously variable transmissions are capable of making frequent fine speed ratio adjustments that are not perceivable by vehicle occupants.

SUMMARY

According to one embodiment, a continuously variable transmission includes a first shaft driveably connected to a power-plant and having a first pair of sheave disks, and a second shaft having a second pair of sheave disks. A tension member is connected to the first and second pairs of disks such that power is transmittable between the first and second shafts. A third shaft is selectively driveably connected to the second shaft via a clutch. The clutch includes an inner race fixed to one of the second and third shafts, and an outer race fixed to a gear and having an inner surface circumscribing the inner race. At least one pawl is biased to couple the races in a fixed relationship for common rotation. The clutch further includes an electric coil and an armature configured to engage the pawl to decouple the races in response to current being supplied to the electric coil.

According to another embodiment, a continuously variable transmission includes an inner race fixed to an output shaft, and a gear defining an outer race circumscribing the inner race and rotatable about the shaft. A pawl is biased to lock the races. An armature is slidably disposed on the gear and has a pin that engages the pawl to move the pawl to a tucked position, disengaging the inner and outer races, in response to current being supplied to a coil.

According to yet another embodiment, a transmission includes a sheave receiving a tension member thereon, and an output shaft drivably connected to the sheave. A gear rotatable about the shaft. The transmission further includes a selectively actuatable clutch including a first race fixed to the shaft and a second race fixed to the gear. The clutch is biased to couple the first and second races and is actuatable to decouple the races allowing the gear and shaft to rotate independently of each other.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
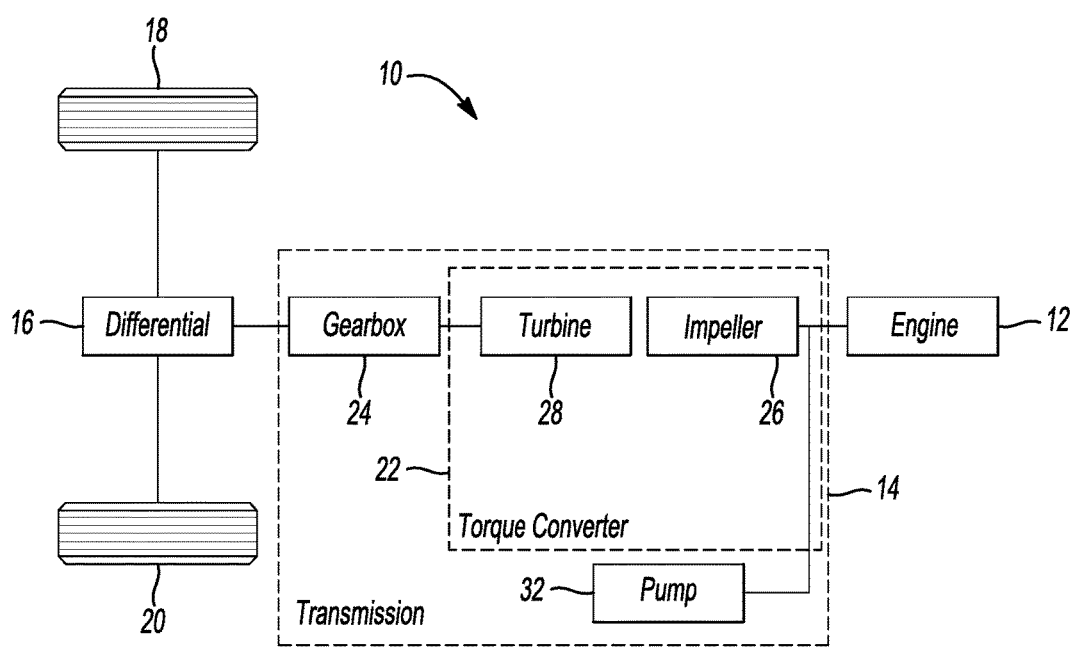
FIG. 1 is a schematic diagram of the vehicle powertrain.

An example vehicle powertrain 10 is illustrated schematically in FIG. 1. In FIG. 1, solid lines represent mechanical connections such as shafts or fixed ratio gearing. The power plant 12 (which may be an internal-combustion engine or an electric machine) generates mechanical power by consuming energy. A transmission 14 transmits the power to a differential 16 at a shaft speed suited to current vehicle needs, which may be faster or slower than the shaft speed at which engine 12 generates the power. The differential 16 reduces the shaft speed by a fixed final-drive ratio and transmits the power to the left and right driving wheels 18 and 20, allowing for slight speed differences between the wheels as the vehicle turns a corner.

The transmission 14 may include a torque converter 22 or other launch device and a gearbox 24. The torque converter 22 includes an impeller 26 that is fixed to the engine crankshaft and a turbine 28 that is fixed to the gearbox input shaft. Torque is transferred hydro-dynamically from the impeller 26 to the turbine 28 when the impeller 26 rotates faster than the turbine 28.

The gearbox 24 includes elements for modifying a speed ratio between and an input shaft and an output shaft. The elements in the gear box vary depending upon the type of the transmission. If the transmission is a continuously variable transmission (CVT), the gearbox includes a pair of controllable variators that are capable of producing a large amount of gear ratios. If the transmission is a step-ratio transmission, the gearbox includes a number of hydraulically-actuated shift elements. The gearbox 24 establishes different speed ratios by engaging the various elements. The transmission pump 32 provides pressurized fluid that engages the elements (such as the variators). Some of the power generated by the engine 12 is used to drive the transmission pump 32, reducing the power delivered to the differential 16. In order to maximize the percentage of power delivered to the differential 16 and thus reduce the amount of fuel consumed by engine 12, it is desirable to minimize the power consumption of transmission pump 32. This can be done by reducing line pressure within the transmission.

Figure 2A:
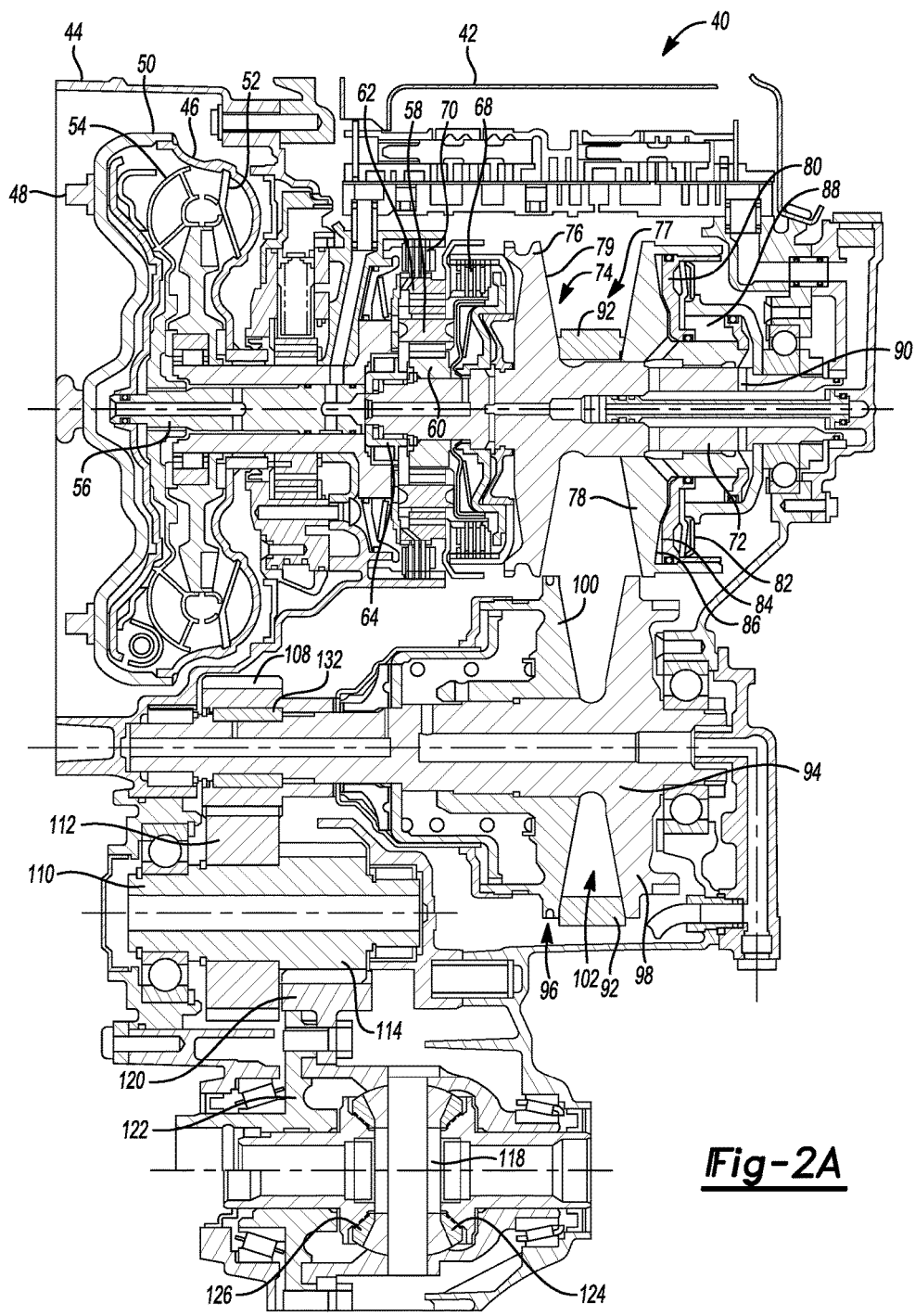
FIG. 2A is a top view, in cross section, of an example continuously variable transmission.

Referring to FIG. 2A, a CVT 40 includes a housing 42 that is connected to a bell housing 44, which bolts to the back of the engine 12. A torque converter 46 is disposed within the bell housing 44 and is connected to a crankshaft of the engine 12 via mounting hardware 48 (such as a flex plate). The mounting hardware 48 is connected to the impeller housing 50, which causes the impeller housing 50 to spin with the crankshaft. The impeller housing 50 defines a plurality of impeller blades 52 that cooperate with the blades of the turbine 54 to define a toroidal-fluid-flow circuit. During operation, a fluid connection between the impeller 52 and the turbine 54 transfers torque from the impeller 52 to the turbine 54. The turbine 54 may be splined to a turbine shaft 56 that is supported for rotation within the housing 42. The turbine shaft 56 is driveably connected to a planetary gear set 58. Two components are driveably connected if they are connected by a power flow path that constrains their rotational speeds to be directly proportional. For example, the turbine shaft 56 may be splined to the carrier assembly 64.

A drive shaft 72 is supported for rotation within the housing 42 such that the shaft 72 and the turbine shaft 56 are substantially coaxial. The drive shaft 72 is also known as an input shaft or a primary shaft. The drive shaft 72 may be splined to the sun gear 60 of the planetary gear set 58. A forward clutch 68 selectively couples the shaft 72 with the planetary gear set 58 to drivably connect the turbine shaft 56 to the shaft 72. For example, the forward clutch 68 may couple the carrier 64 to the shaft 72 providing a 1:1 drive ratio from the turbine shaft 56 to the drive shaft 72.

The transmission 40 also includes a reverse clutch 70 which may also be referred to as a break. When engaged, the reverse clutch 70 couples the ring gear 62 to the housing 42. With the ring gear locked to the housing, torque supplied to the carrier 64 causes the sun gear 60 to turn in a direction opposite the carrier 64. The drive shaft 72 is splined to the sun gear 60 causing the drive shaft 72 to rotate in a reverse direction when torque is supplied.

Rather than having discrete gear ratios, the CVT 40 includes a variator for modifying a speed ratio between a pair of shafts. The variator may include a pair of sheave assemblies driveably connected by a tension member. In one embodiment, the shaft 72 carries a sheave assembly 74 including a stationary disk 76 and a movable disk 78 that is slidably received on the drive shaft 72. The stationary disk 76 may be integrally formed with the shaft 72. The disks 76, 78 cooperate to define a belt (or chain) receiving portion 77. In one embodiment, the movable disk 78 may be coupled to the shaft 72 by a ball spline mechanism that includes a series of balls that register with internal and external grooves formed on the disc and on the shaft, respectively. The movable disk 78 cooperates with a fixed annular piston 80, which is received in an annular cylinder 82. Another annular piston 84 is secured to a clutch-disc cylinder 86. The piston 84 cooperates with the cylinder 86 to define a pressure chamber 88. Pressure is generated within the chamber 88 by circulating fluid to the chamber via a passageway 90 defined in the shaft 72.

A tension member 92 (e.g., a belt or a chain) is clamped between juxtaposed conical surfaces 79 of the disks 76, 78. The belt frictionally engages the conical surfaces of the disks to transfer power from the shaft 72 to the tension member 92. The tension member 92 may be made of steel. The working pitch radius of the tension member 92 may be changed by moving the discs towards or away from each other. The movable disk 78 may be adjusted by supplying oil to the pressure chamber 88.

The transmission 40 also includes a driven shaft 94 (also known as an output shaft or a secondary shaft). Used herein, an "output shaft" is a shaft whose speed is proportional to an average wheel speed independent of the transmission ratio. The driven shaft 94 is supported by the transmission housing 42 for rotation about an axis that is substantially parallel to the axis of the drive shaft 72. The driven shaft 94 includes a second sheave assembly 96 having a stationary disk 98 and a movable disk 100 that is slidably received on the shaft 94. The discs 98, 100 define a belt receiving area 102. Similar to the first sheave assembly 74, the movable disk 100 may be actuated to modify a working pitch radius of the belt 92. The belt 92 is connected to both the drive shaft 72 and the driven shaft 94 to driveably connect the shafts in order to transmit power from the drive shaft 72 to the driven shaft 94. The sheave assemblies 74, 96 cooperate in tandem in order to create a drive ratio between the drive shaft 72 and the driven shaft 94. By adjusting the variator, a torque ratio between the shafts may be increased or decreased as desired.

The driven shaft 94 includes an output gear 108 that is fixed relative to the shaft 94. The gear 108 meshes with a first gear 112 fixed to a countershaft 110. The countershaft also includes a second gear 114 that is also rotationally fixed to the countershaft 110. The countershaft 110 drivably connects the driven shaft 94 with a differential 118. The differential 118 is drivably connected to the driven wheels via one or more axles (also known as half shafts). For example, the differential 118 includes a ring gear 120 that meshes with the second gear 114. The ring gear 120 is fixed with a differential carrier 122. Driver pinions that are disposed on the carrier mesh with different side gears 124, 126, which in turn, are drivably connected to the half shafts.

During certain driving conditions, the transmission may experience a sudden torque shock from the driveline. This sudden torque shock may cause the belt to slip on one or more of the variators. This slipping may cause wear on the belt and/or the variators. The wear may create grooves in the variators, which prevents the belt from easily riding along the variators to change gear ratios. This wear may also reduce belt life. One example event that causes torque shock is wheel hop. During wheel hop, at least one of the driven wheel temporarily leaves the ground (causing rapid acceleration of the wheel) and then reconnects with the pavement (causing rapid deceleration of the wheel). The shock wave from the wheel travels to the transmission-output shaft and causes the output shaft to rapidly decelerate. This rapidly deceleration creates a large speed differential between the belt and the output shaft, which causes slip if the friction force between the shaft and belt is exceeded. The typical solution to this problem is to increase the friction force between the belt and shaft by increasing the line pressure (up to 1000 pounds/square inch) to the sheave assemblies. But, increasing line pressure requires the transmission pump to have a higher duty cycle. This reduces fuel economy and places higher stress on the seals.

In order to prevent damage to the transmission due to a wheel hop (or similar situation), a clutch 132 may be disposed on one of the output shafts (e.g., shaft 94 or shaft 110) to selectively decouple a gear from its corresponding shaft during a possible torque-shock event. For example, output shaft 94 may include a clutch 132 that selectively couples, and decouples, the output gear 108 to the shaft 94. The clutch 132 may be biased to the engaged position (with springs or other means), and actuatable to a disengaged position decoupling the gear from its respective shaft to allow the gear and shaft to rotate independently of each other. By doing this, torque from the driveline is not transmitted to the secondary shaft 94 and the potential for slippage between the tension member 92 and the discs of the variator is eliminated. The clutch 132 may be any mechanism capable of coupling and decoupling a gear from a respective shaft. In one embodiment, the clutch is a selectively actuatable clutch. The selectively actuatable clutch may be a magnetically actuatable clutch operable to decouple the gear and shaft in response to a magnetic field being generated in a vicinity of the clutch.

Figure 2B:
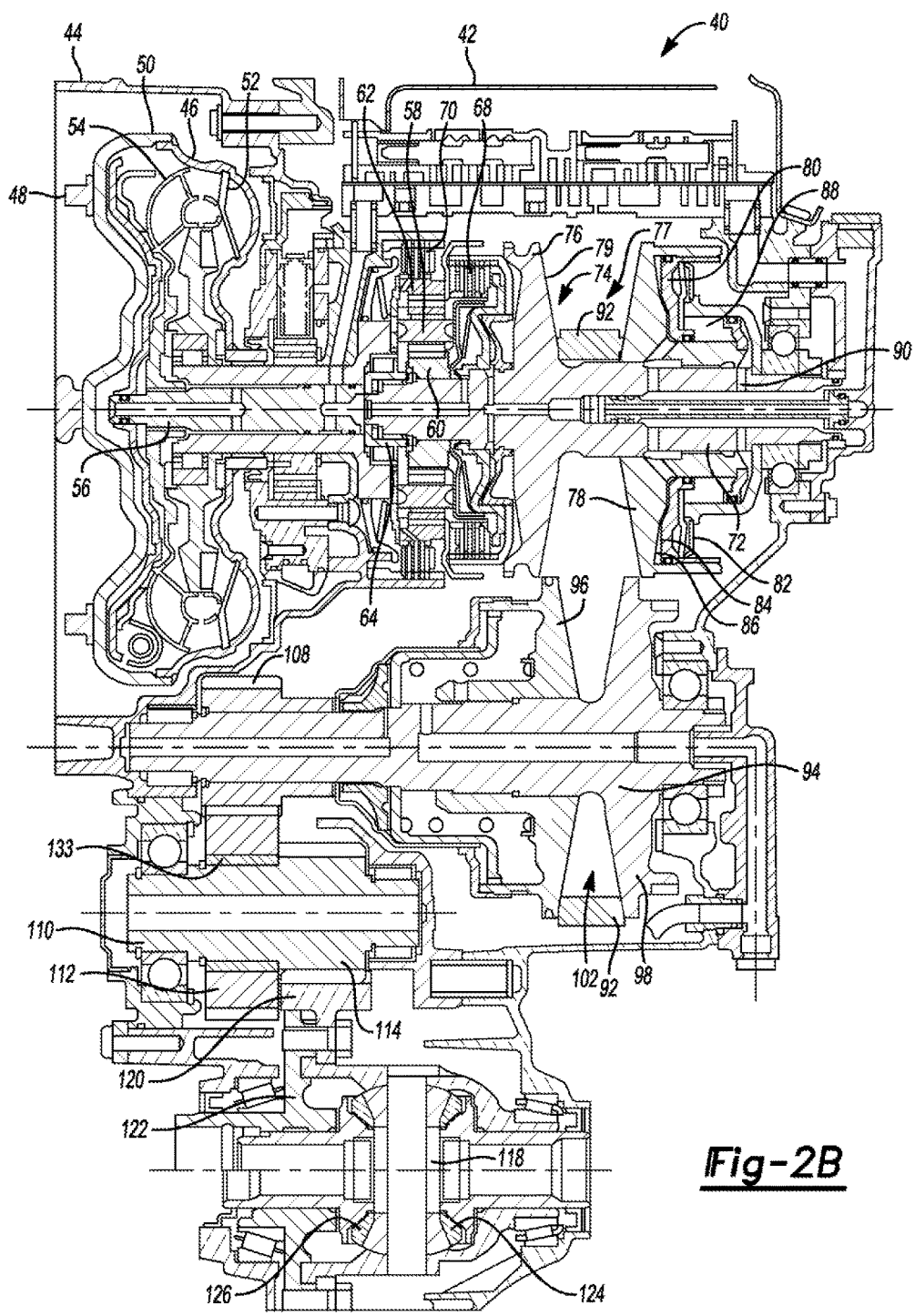
FIG. 2B is a top view, in cross section, of an example continuously variable transmission according to another embodiment.

The clutch (such as clutch 132) may be placed on any of the output shafts of the transmission. Referring to FIG. 2B, in another example embodiment, the output shaft 110 may include the clutch rather than output shaft 94. For example, a clutch 133 is disposed on the output shaft 110. The clutch 133 selectively couples the first gear 112 to the shaft 110. The clutch 133 may be biased to the engaged position, and actuatable to a disengaged position decoupling the gear 112 from shaft 110 allowing the gear and shaft to rotate independently of each other. By doing this, torque from the driveline is not transmitted to the secondary shaft 94 and the potential for slippage between the tension member 92 and the discs of the assembly 96 is eliminated. The clutch 133 could instead be associated with gear 114.

FIGS. 2A and 2B are merely two examples of a CVT. A person having ordinary skill in the art will understand that other CVT arrangements are known in the art and will appreciate that the clutch of this disclosure may be used in conjunction with those arrangements without departing from the scope of this invention. For example, U.S. Pat. No. 5,514,047 discloses other CVT arrangements.

Figure 3:
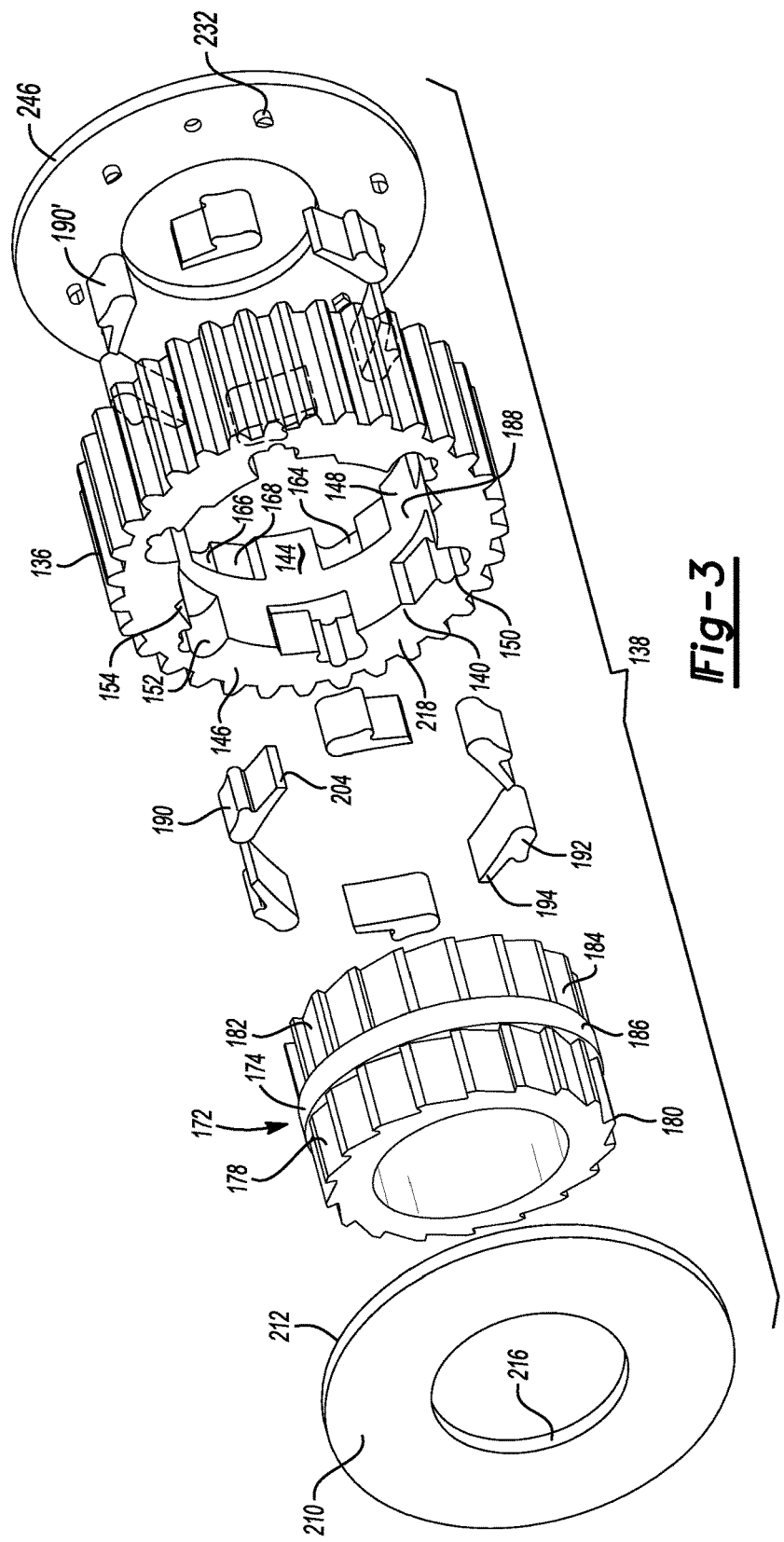
FIG. 3 is an exploded view of an example clutch of the transmission shown in FIG. 2.
Figure 4:
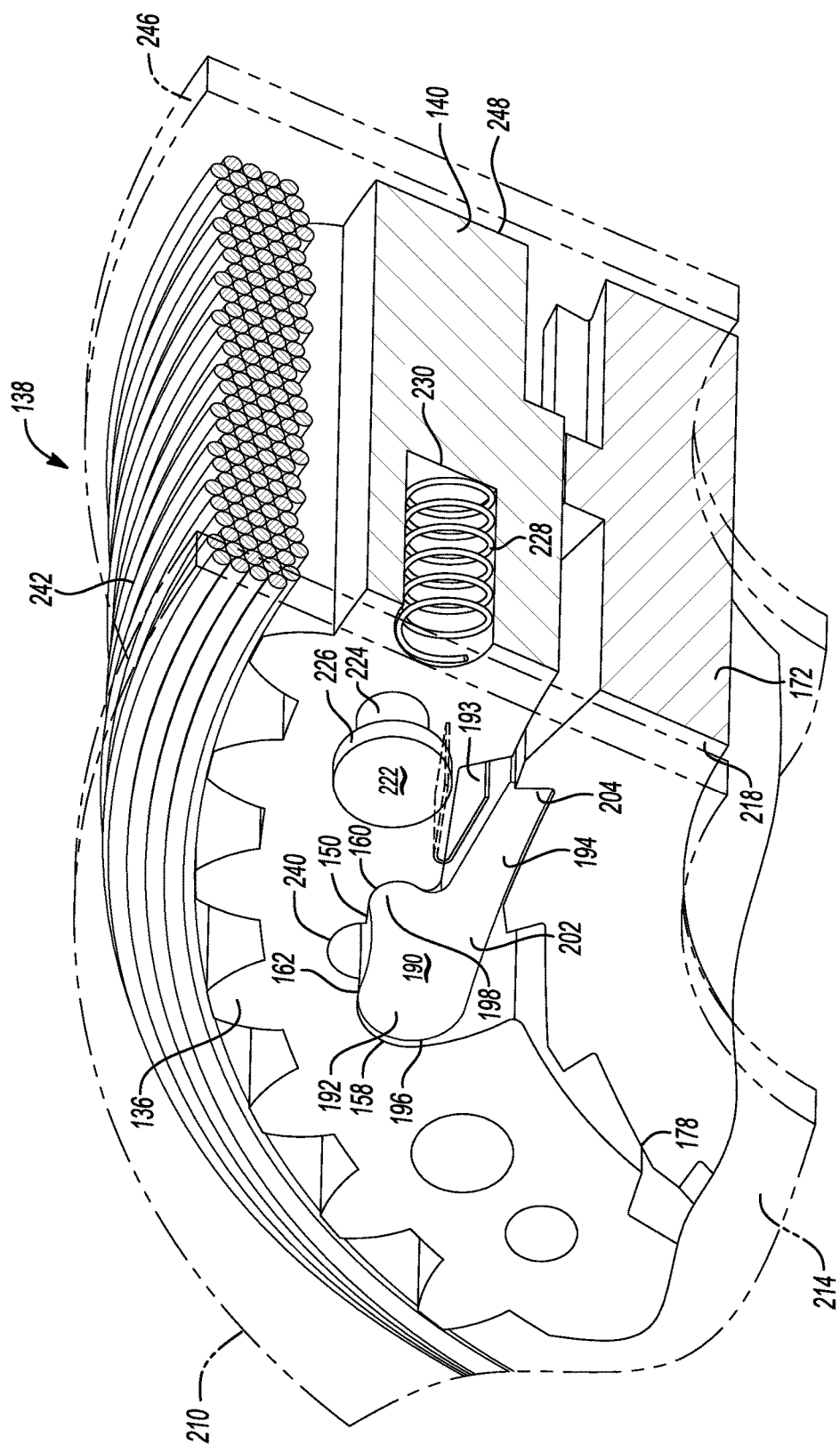
FIG. 4 is a perspective view of a portion of the clutch.
Figure 5:
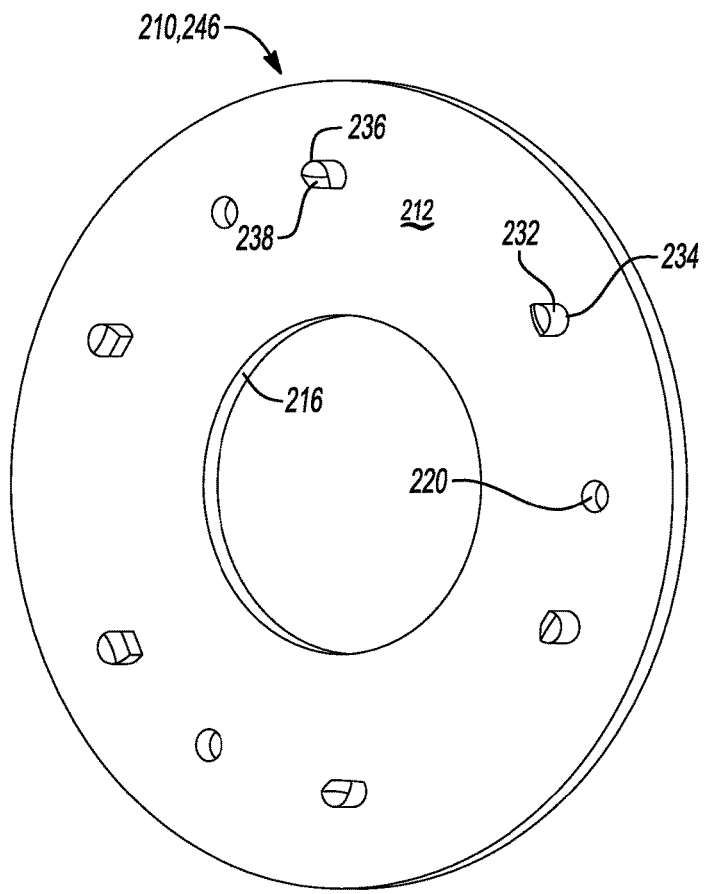
FIG. 5 is a perspective view of an armature of the clutch.

Referring to FIGS. 3, 4 and 5, an example clutch 138 includes an inner race 172 that is fixed to an output shaft and an outer race 140 that may be integrally formed with a gear 136 supported for rotation about the output shaft. In an alternative design, the outer race 140 could include an outer surface that is attached to the gear. The outer race 140 defines an inner surface 144 that circumscribes the outer surface 174 of the inner race 172. The races are sized such that the inner race 172 may freely rotate within the outer race 140 when the clutch is disengaged allowing the gear 136 and the shaft to rotate independently of each other.

The outer race 140 may include a first half 146 and a second half 148. The inner surface 144 of the first half 146 defines a plurality of first pockets 150. Each of the pockets 150 is configured to receive a pawl 190 therein. Each of the pockets may include a deep portion 152 and a shallow portion 154. The deep portion 152 receives the main body portion 192 of the pawl 190 and the shallow portion 154 is configured to receive the arm 194 of the pawl 190.

The second half 148 defines a plurality of second pockets 164 each having a deep portion 166 and a shallow portion 168. The second pockets 164 each receive one of the pawls 190' therein. The pockets 150 and the pockets 164 are oriented in opposite directions. For example, the shallow portion 154 extends in a clockwise direction from the deep portion 152, and the shallow portion 168 extends in a counterclockwise direction from the deep portion 166. As will be explained below in more detail, this allows the clutch to lock in both directions of rotation.

The outer surface 174 of the inner race defines a first cam surface 178 having teeth 180 and a second cam surface 182 having teeth 184. The cam surfaces are configured to engage with the arms 194 of the pawls 190 to lock the inner and outer races relative to each other. Similar to the pockets, the teeth of the cam surfaces 178, 182 are oriented in opposite directions relative to each other allowing the clutch to lock in both directions of rotation. For example, the first cam surface 178 prevents the outer race 140 from rotating in the clockwise direction, and the second cam surface 182 prevents the outer race 140 from rotating in the counterclockwise direction when the pawls 190 are each in the deployed position. The inner race 172 also includes a bearing surface 186 disposed between the first and second cam surfaces. The bearing surface 186 is smooth and is configured to ride on a bearing surface 188 of the outer race 140. The inner race 172 may be splined (or fixed using other known means) to its respective shaft, or may be integrally formed with the shaft.

Each of the pawls 190, 190' are disposed in one of the pockets 150, 164 of the outer race 140. For example, the body portion 192 is rotatably received within the deep portion 152 of the pocket, and the arm 194 is rotatably received within the shallow portion 154. Each of the pawls 190 are rotatable between a deployed position in which the arm 194 extends out of the pocket and engages with the cam surface 178, and a tucked position in which the arm 194 is received within the shallow portion 154 to disengage the pawls 190 and the cam surface. The pawls 190' function in the same way. The clutch 138 is locked when the pawls are in the deployed position and is unlocked when the pawls are in the tucked position. Each of the pawls 190 includes a back lobe 196 that that rides on a curved wall 158 of the pocket, and a front lobe 198 that rides on a curved second wall 160. The arm 194 includes a proximal end 202 that is adjacent to the front lobe 198 and a distal end 204 that engages with corresponding teeth of the cam surface 178. The pawls 190' include similar features. The pawl and the pockets are sized to have slight play allowing the pawls to easily rotate within the pockets. The mass of each of the pawls may be balanced such that centrifugal forces generated by rotation of the outer race 140 bias the pawls in the deployed position to engage the inner race 172. A spring 193 may be disposed in each of the pockets to bias the pawls to the deployed position.

The clutch 138 also includes a first an annular armature 210 that is slidably connected to the gear 136. The armature 210 is operable to move the pawls 190 between the tucked and deployed positions. The armature 210 includes an inner surface 212 that faces the planer side 218 of the gear 136 and an outer surface 214 that faces away from the gear. The armature 210 defines an inner bore 216 that is sized to receive the shaft therethrough. The armature 210 may be steel or other magnetically permeable material.

The armature 210 may be secured to the gear 136 via a plurality of rivets 222. The armature 210 defines bores 220 having a bearing surface that slides along a post 224 of the rivet 222. A head 226 of the rivet prevents the armature from sliding off the post 224. One or more springs 228—that are received in holes 230 defined in the gear 136—bias the armature 210 away from the gear.

The armature 210 includes a plurality of pins 232 extending from the inner surface 212. Each of the pins includes a base 234 that connects to the inner surface 212 and a head 236 at the distal end of the pin. The head 236 may include a tapered surface 238 forming a wedge. Each of the pins 232 are aligned with cutouts 240 defined in the outer race 140 such that the pins may slide in and out of the cutouts 240 when the armature 210 slides along the rivets 222. The cutouts 240 are each adjacent to a corresponding first pocket 150. The cutouts 240 may be a half-moon cutout that is formed in the wall 162 of the pocket 150.

The clutch 138 may include a second armature 246 slidably disposed on the second planer side 248 of the gear 136. The second armature 246 may be identical to the first armature 210 and operate in a similar manner. The second armature 246 is used to control the pawls 190' that engage with the second cam surface 182. The second armature 246 also includes pins that engage with the pawls 190' disposed in the second pockets 164 to rotate the pawls 190' into the tucked position to disengage the second cam surface from the pawls.

The clutch 138 may be a magnetically actuatable clutch that uses a magnetic field to actuate the armature towards the gear 136. The clutch 138 includes a coil 242 that generates a magnetic field to attract the permeable armatures 210 and 246 towards the gear. The coil 242 may be a stationary component that is disposed next to the gear 136. The coil 242 may circumferentially extend around a portion of the outer curved surface of the gear 136 on a side where the gear does not engage with a corresponding gear. The magnetic field is strong enough to overcome the force of the springs 228 causing the inner surfaces 212 to move toward their respective first and second planer sides 218, 248. This movement of the armature 210 causes the pins 232 to slide within the cutouts 240 and engage with the pawls 190. Similar action occurs with the other armature 246. The pins 232 cause the pawls 190 to rotate to the tucked position when the pins engage with the pawls to decouple the inner and outer races.

Figure 6A:
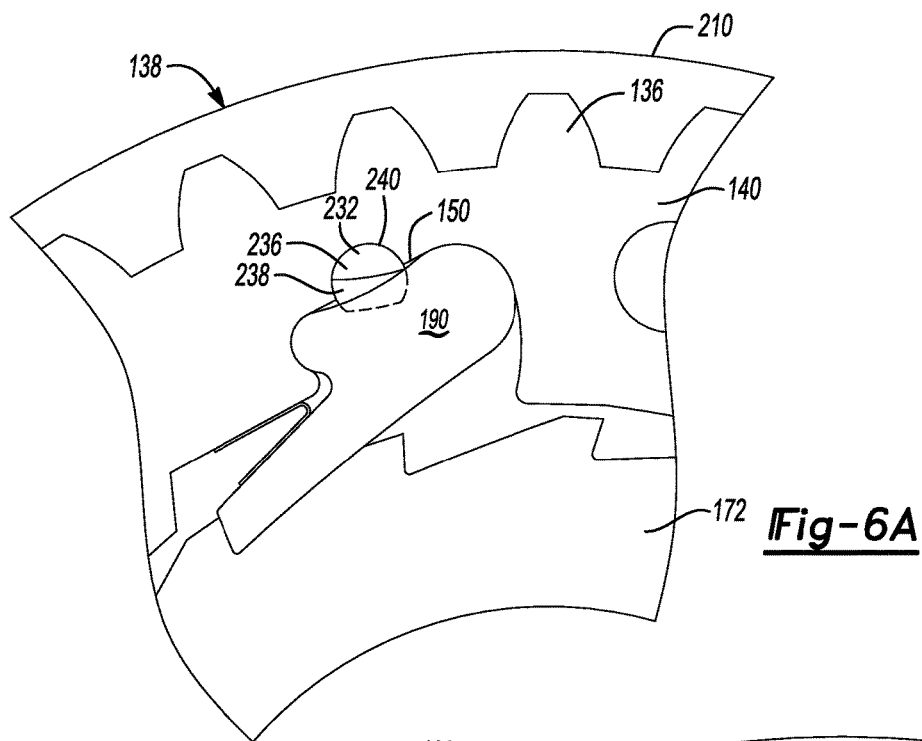
FIG. 6A is a diagrammatical view illustrating the clutch in a locked position.

FIG. 6A illustrates the clutch 138 in its default position (locked). The springs 228 have bias the armature away from the gear 136 and the pins 232 are disengaged with the pawls 190. The pins 232 may be completely out of the cutouts 240, or the head of the pins may be at least partially disposed within the cutouts 240. Because of the tapered surface 238, a portion of the pins may be within the cutouts 240 without engaging the pawls 190.

Figure 6B:
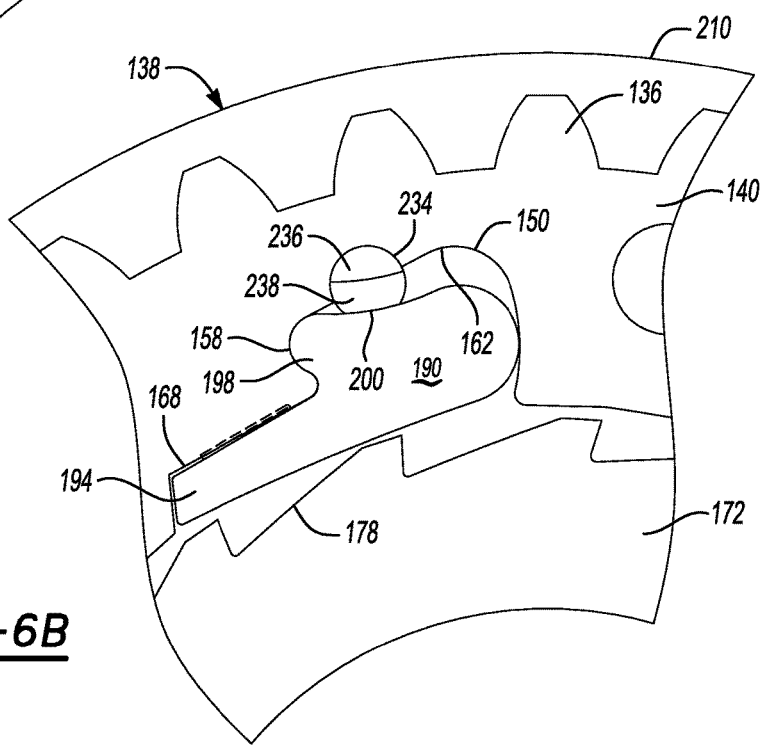
FIG. 6B is a diagrammatical view illustrating the clutch in an unlocked position.

FIG. 6B illustrates the clutch 138 in its actuated position (unlocked). The clutch is actuated to the unlocked position by energizing the coil 242 (not shown) causing the armature 210 to actuate the pawls 190 to the tucked position. In the unlocked position, each of the pins 232 has slid forward to wedge the pin-engaging surface 200 of the pawl 190 away from wall 162 of the pocket 150. This causes the front lobe 198 to pivot about the first wall 158 causing the arm 194 to rotate into the shallow portion 168 and disengage from the cam surface 178. The pawls 190 will remain in the tucked position until the pins 232 are retracted from the cutouts 240.

Figure 7:
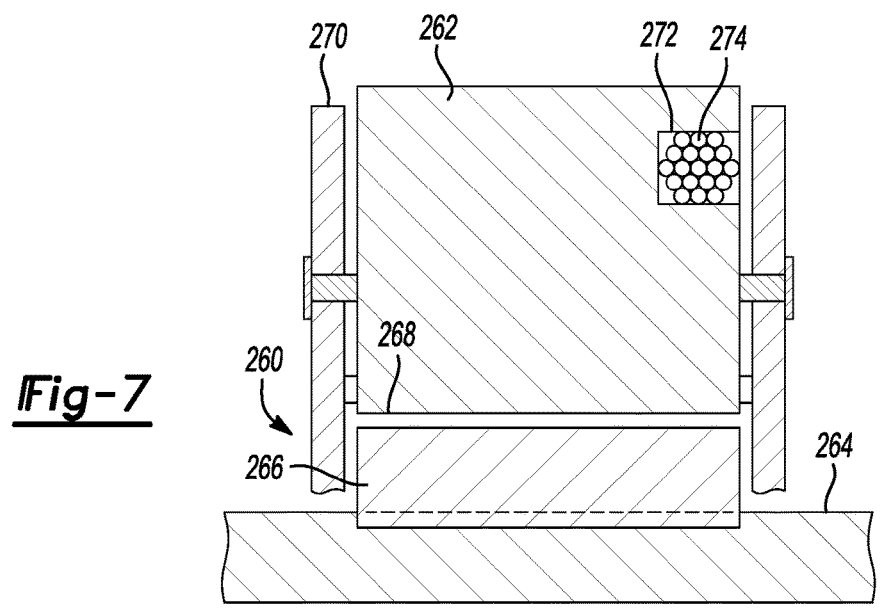
FIG. 7 is a diagrammatical view of another clutch.

Referring to FIG. 7, a gear 262 is supported for rotation about an output shaft 264. A clutch 260 is used to selectively couple and decouple the gear 262 from the output shaft 264. The clutch 260 includes an outer race 268 that is fixed to the gear 262, and an inner race 266 that is fixed to the shaft 264. The gear 262 may define the outer race 268. The clutch 260 is similar to clutch 138 except that the coil 274 is received within a portion of the gear 262. For example, the gear 262 defines a slot 272 that receives the coil 274 therein. The coil 274 controls the armatures 270 that are used to engage and disengage the pawls to couple and uncouple the inner and outer races to each other as described above. In this embodiment, the coil 274 rotates with the gear 262.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A continuously variable transmission comprising:
   a first shaft driveably connected to a power-plant and including a first pair of sheave disks;
   a second shaft including a second pair of sheave disks;
   a tension member connected to the first and second pairs of disks such that power is transmittable between the first and second shafts; and
   a third shaft selectively driveably connected to the second shaft via a clutch, the clutch including:
      an inner race fixed to one of the second and third shafts and defining a cam surface;
      an outer race fixed to a gear and having an inner surface circumscribing the inner race;
      at least one pawl configured to engage with the cam surface and biased into engagement with the cam surface to couple the races in a fixed relationship for common rotation;
      an electric coil; and
      an armature configured to engage the pawl to decouple the races in response to current being supplied to the electric coil.

2. The transmission of claim 1, wherein the armature defines a pin configured to extend into the outer race to engage the pawl to decouple the races in response to current being supplied to the electric coil.

3. The transmission of claim 1, wherein the outer race defines at least one pocket, and a body portion of the at least one pawl is pivotably disposed in the pocket such that the pawl is rotatable between a tucked position where the pawl is disengaged with the inner race and a deployed position wherein the pawl is engaged with a cam surface of the inner race, and wherein the pawl is configured to rotate to the tucked position in response to the armature engaging the pawl.

4. The transmission of claim 1, wherein the outer race defines posts and the armature defines bores that receive the posts slidably connecting the armature to the outer race, wherein the armature is biased away from the outer race and includes pins each aligned with a cutout defined in the outer race, wherein, in response to current being supplied to the electric coil, the armature is configured to slide towards the outer race causing the pins to travel in the cutouts and engage the pawl decoupling the races.

5. The transmission of claim 1, wherein the inner race is fixed to the second shaft and the gear is selectively coupled to the second shaft.

6. A continuously variable transmission comprising:
an inner race fixed to an output shaft;
a gear defining an outer race with a cutout and rotatable about the shaft;
a pawl biased to lock the races; and
an armature slidably disposed on the gear and having a pin in the cutout and engaging the pawl to move the pawl to a tucked position disengaging the races in response to current being supplied to a coil.

7. The transmission of claim 6, wherein the outer race defines a pocket and a body portion of the pawl is pivotably disposed in the pocket, wherein the pin is configured to wedge the body portion away from a wall of the pocket pivoting the pawl to the tucked position in response to current being supplied to the coil.

8. The transmission of claim 7, wherein a cutout is defined in the wall of the pocket and is configured to receive the pin therein.

9. The transmission of claim 7, wherein the pin includes a tapered head.

10. The transmission of claim 6, wherein the inner race defines a cam surface configured to engage with the pawl.

11. The transmission of claim 6, wherein the output shaft further includes a sheave assembly configured to receive a belt thereon.

12. The transmission of claim 6, wherein the outer race defines a channel and the coil is disposed within the channel.

13. A transmission comprising:
a sheave receiving a tension member thereon;
an output shaft drivably connected to the sheave;
a gear rotatable about the shaft; and
a selectively actuatable clutch including:
a first race fixed to the shaft and defining a cam surface,
a second race fixed to the gear,
a pawl supported to rotate with the second race and biased to engage the cam surface to couple the first and second races, and
an actuator slidably connected to the second race, and wherein the pawl is configured to pivot relative to the second race in response to the actuator engaging the pawl to disengage the pawl with the cam surface allowing the first and second races to rotate independently of each other.

14. The transmission of claim 13, wherein the selectively actuatable clutch is a magnetically actuatable clutch actuatable to decouple the races in response to a magnetic field being generated in one of the first and second races.

15. The transmission of claim 13, wherein the actuator further includes a pin aligned with a cutout defined in the second race and configured to slide within the cutout to engage with the pawl.

16. The transmission of claim 13, wherein the output shaft further includes a second sheave assembly that receives the tension member thereon.

17. The transmission of claim 13 further comprising a differential and wherein the gear meshes with a ring gear of the differential.

18. The transmission of claim 13, wherein the gear and the second race are integrally formed.

* * * * *